United States Patent
Rosen et al.

(10) Patent No.: US 8,475,114 B2
(45) Date of Patent: Jul. 2, 2013

(54) AIR CYCLE MACHINE AIR BEARING SHAFT

(75) Inventors: Seth E. Rosen, Middletown, CT (US); Craig M. Beers, Wethersfield, CT (US); Robert M. Pragluski, Springfield, MA (US); Michael P. Rowley, East Longmeadow, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 736 days.

(21) Appl. No.: 12/701,819

(22) Filed: Feb. 8, 2010

(65) Prior Publication Data

US 2011/0192165 A1  Aug. 11, 2011

(51) Int. Cl.
 *F01D 5/08* (2006.01)
(52) U.S. Cl.
 USPC ........... 415/104; 415/109; 415/111; 415/115; 415/180; 415/216.1; 415/229; 29/889.1; 29/889.2
(58) Field of Classification Search
 USPC ............. 415/104, 109, 111, 115, 180, 216.1, 415/229; 29/889.1, 889.2
 See application file for complete search history.

(56) References Cited

U.S. PATENT DOCUMENTS

| | | | |
|---|---|---|---|
| 2,636,665 A * | 4/1953 | Lombard | 415/115 |
| 3,652,186 A * | 3/1972 | Carter | 415/110 |
| 3,705,775 A * | 12/1972 | Rioux | 60/269 |
| 4,557,704 A | 12/1985 | Ito et al. | |
| 4,949,821 A | 8/1990 | Murota et al. | |
| 4,967,565 A | 11/1990 | Thomson et al. | |
| 5,014,518 A | 5/1991 | Thomson et al. | |
| 5,086,622 A | 2/1992 | Warner | |
| 5,113,670 A | 5/1992 | McAuliffe et al. | |
| 5,125,597 A | 6/1992 | Coffinberry | |
| 5,129,784 A | 7/1992 | Yoshikawa et al. | |
| 5,143,329 A | 9/1992 | Coffinberry | |
| 5,144,794 A * | 9/1992 | Kirikami et al. | 415/115 |
| 5,704,218 A | 1/1998 | Christians et al. | |
| 5,791,868 A * | 8/1998 | Bosley et al. | 415/104 |
| 5,887,445 A | 3/1999 | Murry et al. | |
| 5,921,683 A | 7/1999 | Merritt et al. | |
| 6,151,909 A | 11/2000 | Carter et al. | |
| 6,305,156 B1 | 10/2001 | Lui | |
| 6,324,831 B1 | 12/2001 | Izadi et al. | |
| 6,457,318 B1 | 10/2002 | Lui et al. | |
| 6,615,606 B2 | 9/2003 | Zywiak | |
| 7,267,523 B2 | 9/2007 | Saville | |
| 7,402,020 B2 | 7/2008 | Beers et al. | |
| 7,942,635 B1 * | 5/2011 | Murray | 415/229 |

\* cited by examiner

*Primary Examiner* — Igor Kershteyn
(74) *Attorney, Agent, or Firm* — Carlson, Gaskey & Olds, P.C.

(57) ABSTRACT

An air cycle machine includes a shaft formed from end sections attached to a center section. The center section includes a first diameter that is supported on bearings within the air cycle machine and a second diameter that forms a part of an interface with a corresponding end section. The second diameter is less than the first diameter and extends an axial distance from an end of the center section and provides for the weld beam to be directed normal to the interface location such that weld quality and manufacturing efficiencies are improved.

22 Claims, 5 Drawing Sheets

AIR CYCLE MACHINE AIR BEARING SHAFT

BACKGROUND

This disclosure generally relates to an air cycle machine utilized as part of an aircraft environmental control system (ECS).

An ECS provides a supply of conditioned air to an enclosure, such as an aircraft cabin and cockpit. The ACM is an integral part of the ECS. Conventional ACM's include at least two turbines and a compressor mounted along a common axis. The turbines and compressor are assembled using multiple shaft pieces and held together with a tie rod assembly. For example, the compressor may be mounted as a link between two shaft pieces. Typically, each shaft piece is machined to a desired tolerance in a separate operation and later assembled to the other pieces.

Disadvantageously, the tolerances from each component compound in assembly. This often results in misalignment of journal bearing portions of the ACM and leads to undesirable shaft loads, vibration, and imbalance during ACM operation. Furthermore, conventional assemblies often require complex and heavy components to hold the shaft pieces, turbines, and compressor together, such as tie rods and robust static structures.

Accordingly, it is desirable to develop and design improved ACM shafts and methods of fabricating ACM shafts.

SUMMARY

A disclosed ACM includes a shaft formed from end sections attached to a center section. The center section includes a first diameter that interfaces with air bearings of the ACM and a second diameter that forms a part of an interface with a corresponding end section. The second diameter is less than the first diameter and extends an axial distance from an end of the center section such that interference with a welding beam is substantially eliminated. Moreover, the configuration of the second diameter provides for the weld beam to be directed normal to the interface location such that weld quality and manufacturing efficiencies are improved.

These and other features disclosed herein can be best understood from the following specification and drawings, the following of which is a brief description.

DETAILED DESCRIPTION

Figure 1:
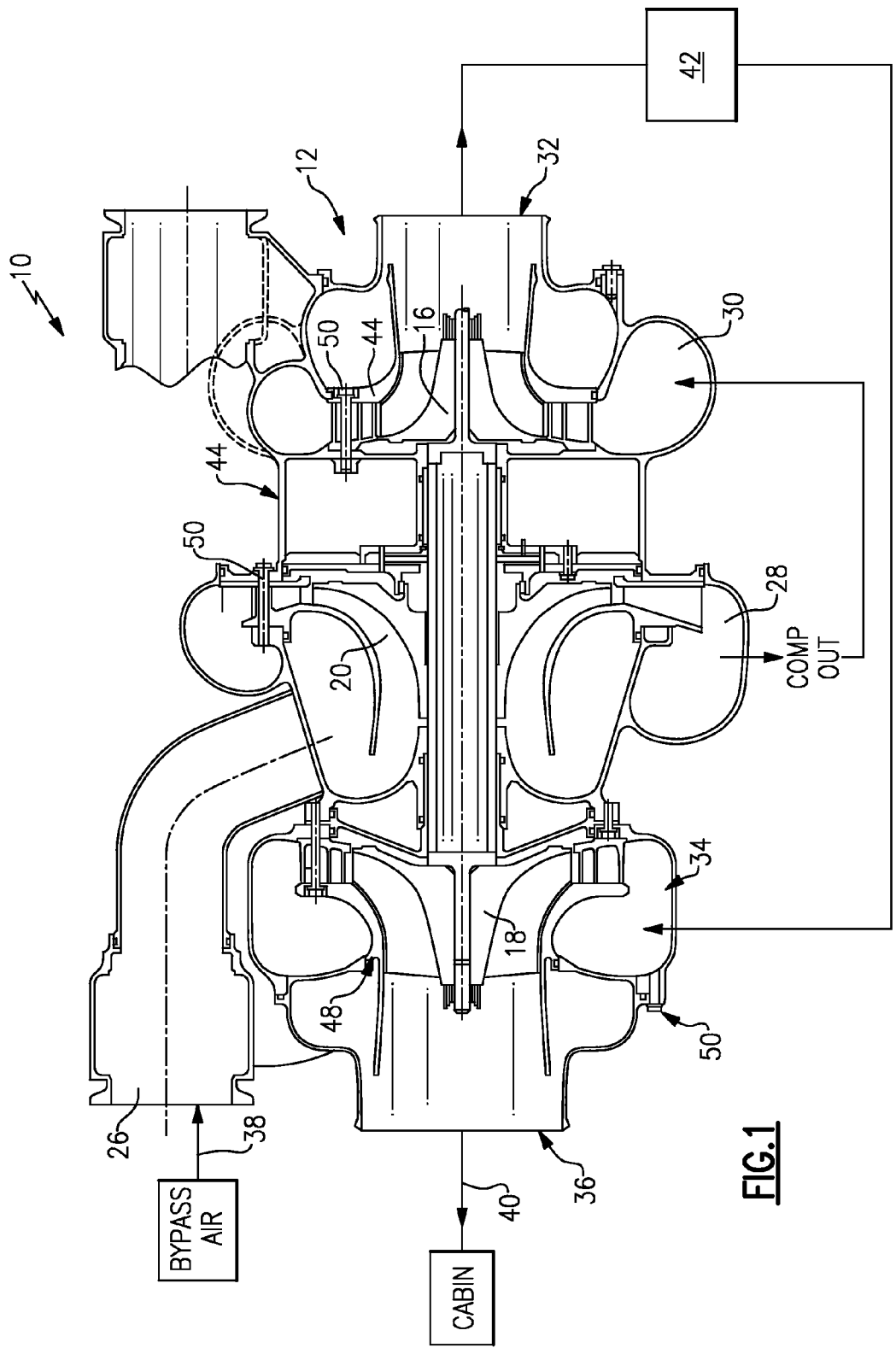
FIG. 1 is a schematic view of an air cycle machine for an environmental control system for an aircraft.

FIG. 1 illustrates a general schematic view of an environmental control system (ECS) 10. The ECS 10 includes an air cycle machine 12 that receives bypass air that is conditioned in various stages symbolically indicated at 42 to produce air flow at a desired temperature for an aircraft cabin. Although, the example ACM 12 is described as utilized in an aircraft ECS, other applications and uses will benefit from this disclosure.

The example ACM 12 includes a shaft 14 that supports rotation of a compressor 20 and first and second turbines 16, 18. Bleed air 38 input into the compressor 20 through inlet 26 is compressed from output outlet 28 at a desired pressure. Air output from the compressor 20 is conditioned by various devices to change the characteristics of the air that is finally input into the first turbine 16. Air from the first turbine 16 is output through outlet 32 and further conditioned by conditioning devices indicated schematically at 42. The second turbine 18 receives air and outputs that air to the aircraft cabin.

The first and second turbines 16, 18 and the compressor 20 are all fixed to the shaft 14. Accordingly, rotation of the turbines 16, 18 caused by airflow drives the compressor 20. As appreciated, the example ACM 12 and ECS 10 include other devices such as heat exchangers, condensers, and water collectors to condition air at a desired pressure and temperature to the aircraft cabin. Many combinations of conditioning devices could be utilized and are within contemplation for use with the example ACM 12.

The example ACM 12 includes a housing with end sections 46 and 48 attached to a center section 44. The sections 44, 46 and 48 are attached to each other with fasteners 50. The fasteners 50 facilitate assembly and disassembly of the ACM 12 for maintenance purposes.

Figure 2:
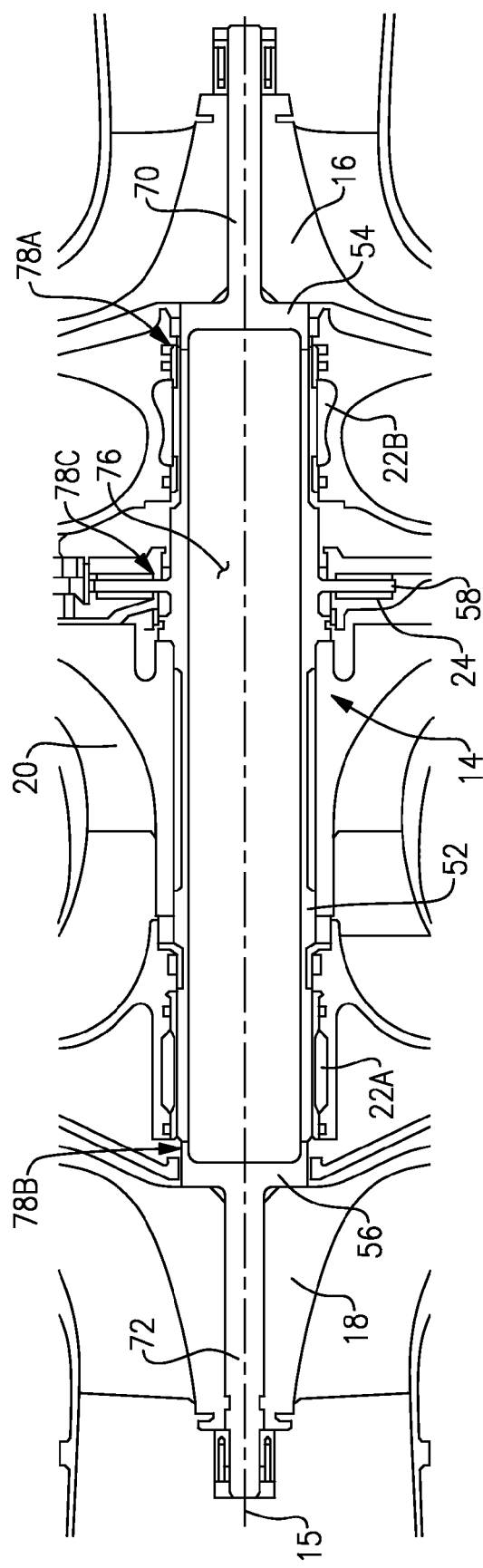
FIG. 2 is an enlarged view of an air bearing shaft for an air cycle machine.

Referring to FIG. 2, the shaft 14 is supported within the housing sections 44, 46 and 48 for rotation about the axis 15. The example shaft 14 includes a center section 52 and first and second end caps 54, 56 that are welded to ends of the center section 52. A thrust flange 58 is welded to an outer diameter of the center section 52. A thrust bearing 24 cooperates with the thrust flange 58 to constrain axial movement of the shaft 14. The center shaft section 52 includes a cavity 76 such that the center shaft section 52 is hollow. The shaft 14 is supported within the housing by bearings 22A and 22B. The example bearings 22A and 22B are foil air bearings.

Figure 3:
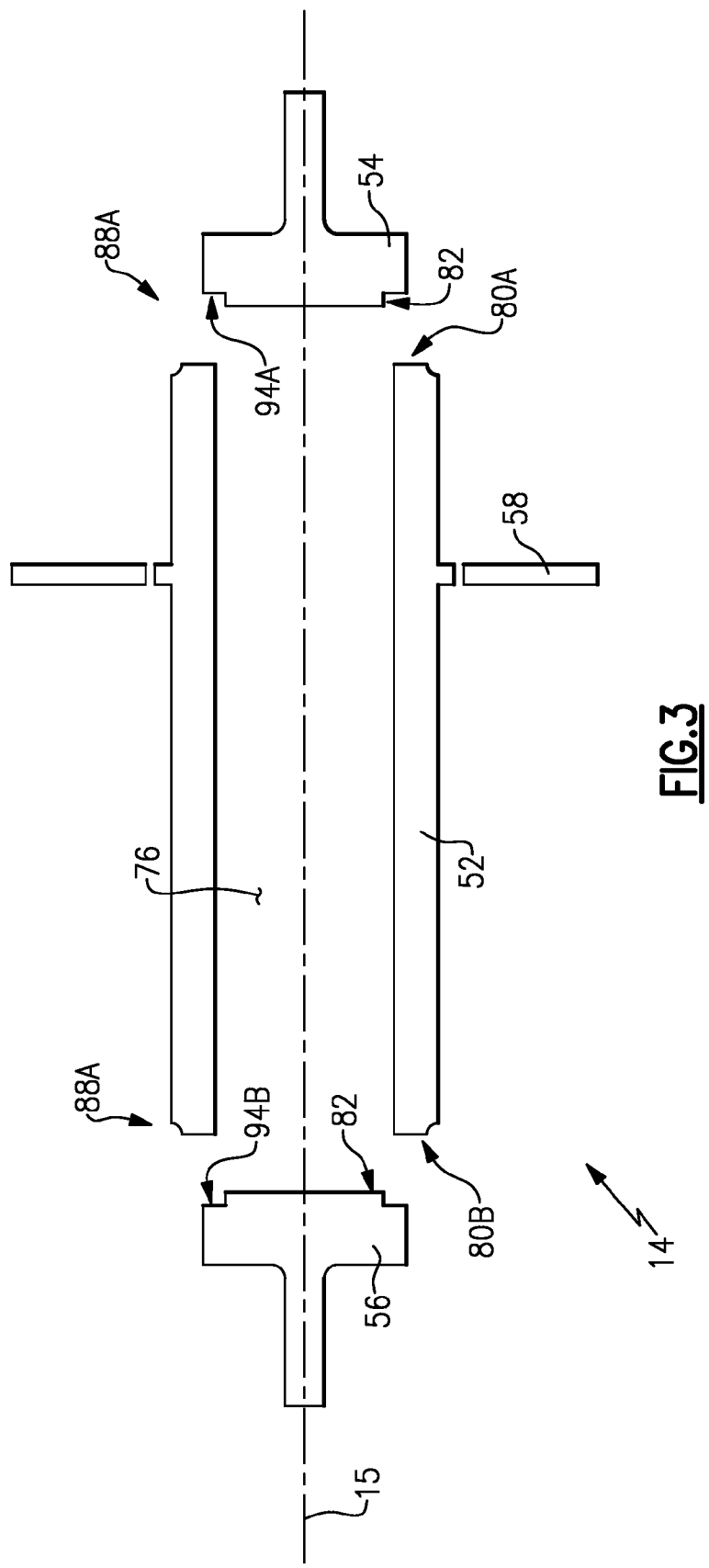
FIG. 3 is an exploded view of components parts of the air bearing shaft.

Referring to FIG. 3, the center shaft section 52 includes a first axially facing surface 80A on a first end and a second axially facing surface 80B on a second end. The end caps 54, 56 include guide shoulders 82 that fit within an inner diameter of the center shaft section 52. Axially facing surfaces of the shaft 14 are then welded to a corresponding axially facing surface of the end caps 54, 56. The thrust flange 58 is welded to a corresponding location on an outer surface of the center shaft section 52. The example thrust flange 58 is attached to an intermediate point on the center shaft section 52 and extends radially outward to provide a surface that corresponds with the thrust bearing 24 mounted within the housing 44.

Figure 4:
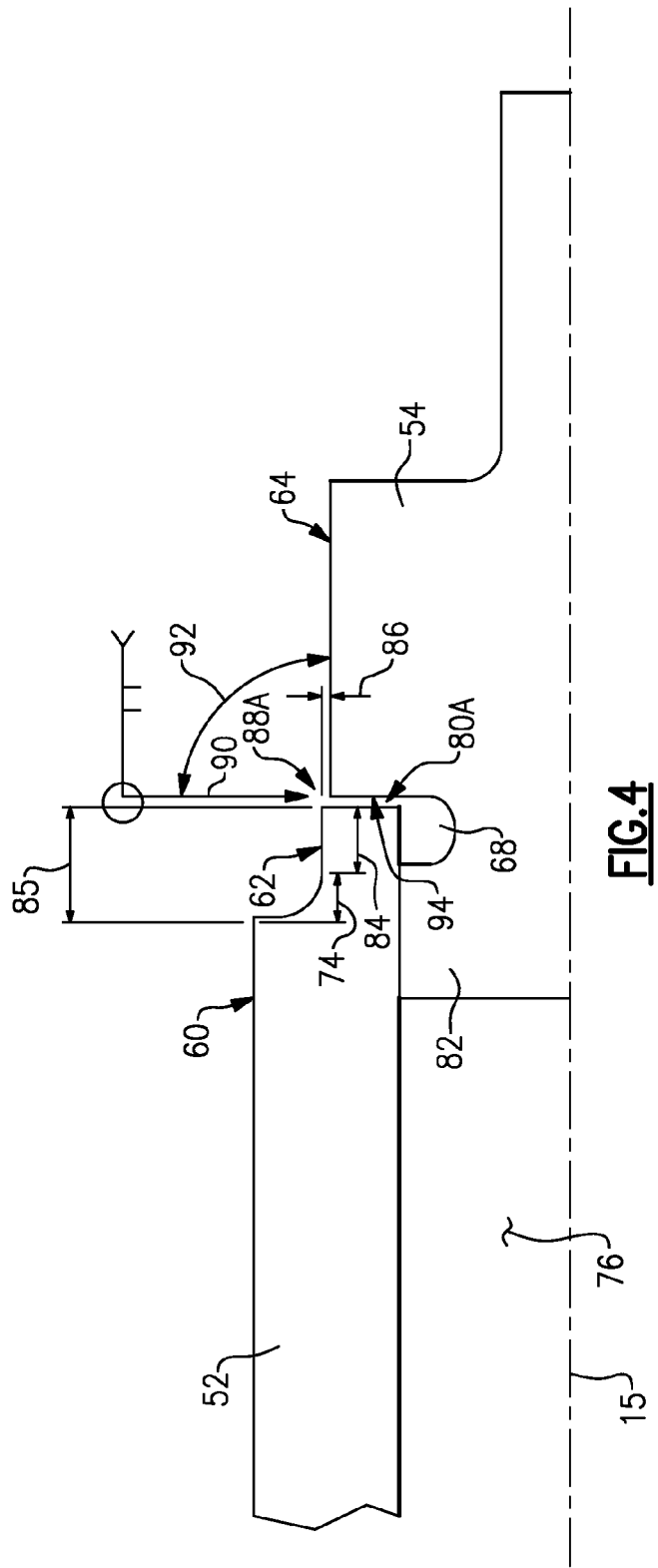
FIG. 4 is an enlarged view of an interface between components of the example air bearing shaft.

Referring to FIG. 4, the interface 88 between the end cap 54 and the center section 52 is formed by abutting the axially facing surface 80A of the center shaft section 52 with the axially facing surface 94 of the end cap 54. A welding beam 90 is directed substantially normal to the interface 88 to form a weld that holds the end cap 54 to the center section 52. The example weld is formed as a continuous weld about the circumference of the interface 88 between the center section 52 and the end cap 54.

The center section 52 includes a first diameter 60 that is spaced axially away from the end and axially facing surface 80A. The center shaft section 52 includes a second diameter 62 over a length 84. The second diameter 62 is disposed over the axial length 84 beginning at the axially facing surface 80A and extending toward a transition region between the first diameter 60 and the second diameter 62. The example transition region is disposed over an axial length 74 and comprises a radial surface. Other surface configurations such as a chamfer and angled surface could also be utilized to transition from the larger first diameter 60 to the smaller second diameter 62.

The second diameter 62 facilitates the orientation of the weld beam 90 at an angle substantially normal to the surface of the interface 88. The end cap 54 includes an outer diameter 64 that is substantially equal to the second diameter 62. The outer diameter 64 and the second diameter 62 may differ slightly due to tolerance considerations. However, the example interface 88 includes a difference indicated at 86 between the second diameter 62 and the end cap diameter 64 of no more then approximately 0.010" of an inch (0.254 mm). In another example the difference indicated at 86 is not greater than 0.005" of an inch (0.127 mm). The relationship between the end cap diameter 64 and the second diameter 62 provide for the orientation of the weld beam 90. If the difference between the second diameter 62 and the end cap diameter 64 is excessive, the weld beam 90 can be distorted and not provide the desired quality of weld.

In other words, if one of the diameters 62 and 64 is significantly different than the other, the weld beam 90 will be distorted when directed at an angle normal to the interface. In such instances, the weld beam 90 would be required to be directed at an angle to the interface to prevent beam distortion. For example if the weld beam 90 were directed at a 45 degree angle to the interface 88, the weld beam 90 would distort and not provide the desired weld quality and repeatability.

Because the example interface does not exceed the difference 88, the weld beam 90 provides desired weld quality and repeatability when directed normal to the interface. Further, because the orientation of the weld beam 90 is normal to the interface, and therefore, the same for end, the shaft 14 can be mounted in the welding machine once and shuttled to and from the weld beam 90 without re-orientating a relative angle between the shaft 14 or the weld beam. As appreciated, if the weld beam 90 were required to be orientated at an angle relative to the interface, merely shuttling the shaft 14 axially could not align the beam 90 as needed for welding the second end cap 56 to the opposing end of the center shaft section 52. The disclosed configuration provides for simple axial movement of either the shaft 14 or the weld beam 90 to align the weld beam 90 with the interface 88.

Further, the larger first diameter 60 is spaced apart from the axial end surface 80A a total axial length 85 such that it does not interfere with the weld beam 90. The example axial spacing 85 comprises both the axial length 84 of the second diameter 62 and the axial length 74 of the transition region. The example axial spacing is approximately 0.050" inches with a tolerance of +/−0.005" inch. As appreciated other spacing lengths determined to provide sufficient clearance for the weld beam could also be utilized.

The example weld interface is a butt weld formed utilizing an electron beam (EB) welding process. The example EB welding process provides a continuous weld about the circumference of the shaft 14 to a depth completely through the thickness of the center section 52. Other welding process and weld configurations could be utilized within the contemplation of this disclosure.

The end cap 54 includes an under cut 68 disposed below the interface 88 between the end cap 54 and the center section 52. The end cap 54 further includes the guide portion 82 that fits within the inner diameter of the center shaft section 52 to align the diameters of the end cap 54 with that of the center section 52.

Figure 5:
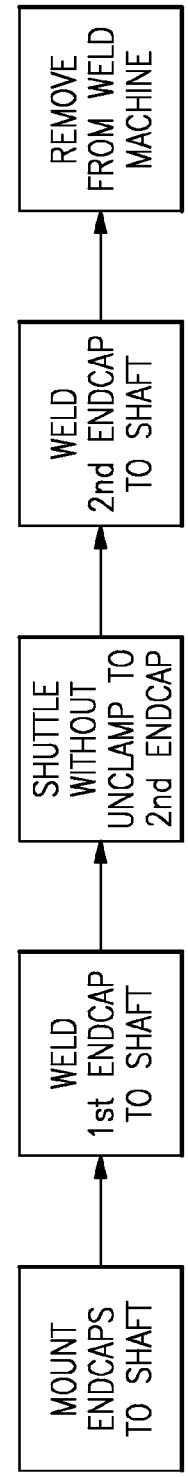
FIG. 5 is a flow diagram of the steps of manufacture to produce the example air bearing shaft.

Referring to FIG. 5, with continued reference to FIG. 4, the example shaft 14 is manufactured by first mounting end caps 54 and 56 to each of the ends of the center shaft section 52. Mounting of the end caps 54, 56 to the center section 52 includes abutting axially facing surfaces 80A, 80B of the center section 52 against corresponding axially facing surfaces 94A, 94B of the corresponding end cap 54, 56. The end caps 54, 56 include the guide section 82 that is received within the cavity 76 of the center shaft section 52. The guide section 82 provides for the diameters 64 and 62 to be aligned circumferentially such that no location of the interface exceeds the tolerance range indicated at 86.

The abutted axial surfaces are transverse to the axis of rotation 15. The weld beam 90 is directed at 90 degrees to the axis of rotation, or normal to the axis 15 at the interface 88. The shaft 14 is then rotated at a defined speed with the beam 90 directed into the interface 88 to provide the desired weld. The speed and power of the weld beam 90 are determined according to application specific parameters. Further, the example weld beam 90 comprises an electron beam and therefore the parameters and environment as is known to facilitate the electron beam welding process is utilized.

Once the interface 88 between the first end cap 54 and the center section 52 is completed, the shaft 14 is shuttled axially to align the interface 88B including the axial surface 80B of the center shaft 52 and the axial surface 94B of the second end cap 56. Because the weld beam 90 is orientated normal to the shaft 14, all that is required is an axial transit of the shaft 14. No angular adjustment is required. Moreover, the shaft remains in the original mounting such that any previously determined datum points utilized for the welding process remain valid. Once in position, the shaft 14 is again rotated with the beam 90 performing the desired weld operation.

Once the end caps 54, 56 have been attached by welding to the center section 52, the thrust flange 58 is attached by a welding operation. As appreciated, welding of the thrust flange 58 requires a weld orientated in substantially parallel to the axis of rotation 15. Therefore, welding of the thrust flange 58 is accomplished in a process separate from welding of the end caps 54, 56. The process for attaching the thrust flange 58 could be accomplished in the same mounting utilized for welding the end caps 54, 56 with another weld beam. Alternately, the thrust flange 58 could be attached in a separate process and mounting from the process utilized to attach the end caps 54, 56.

Figure 6:
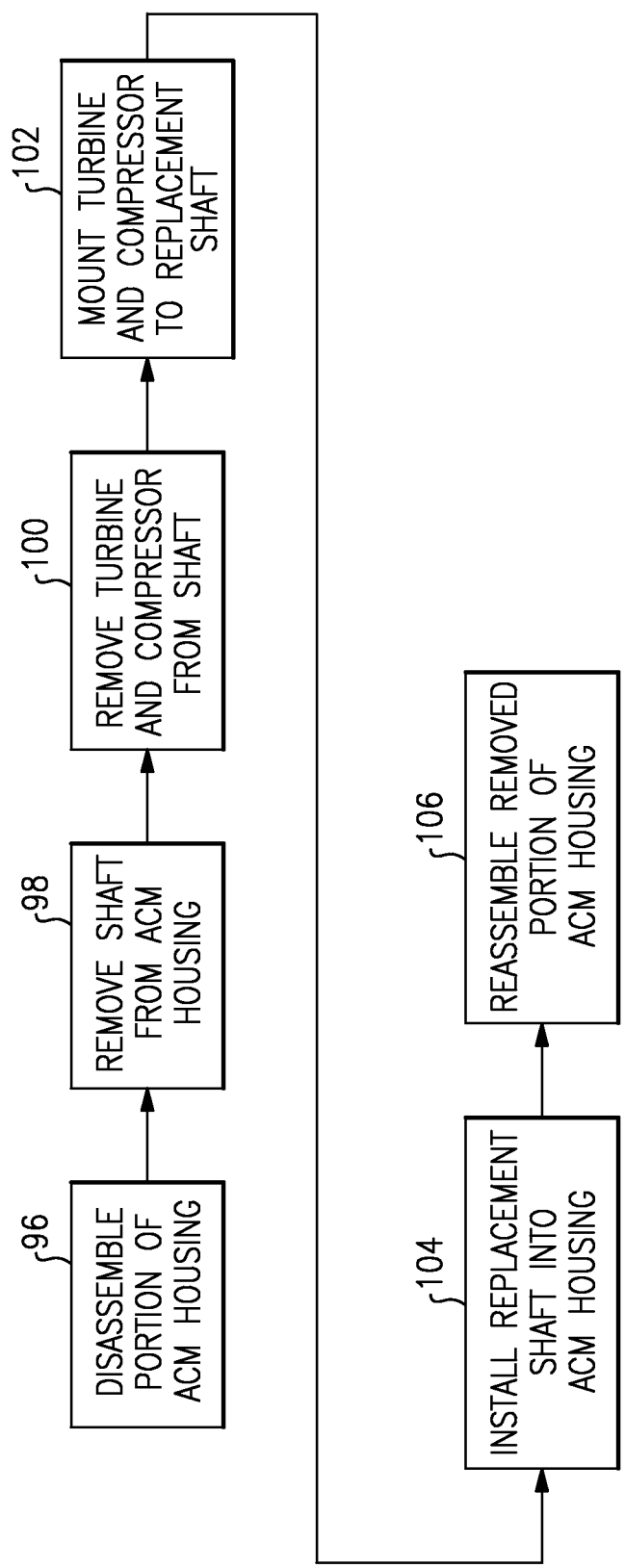
FIG. 6 is a flow diagram of the steps of installing an example air bearing shaft into an ACM.

Referring to FIGS. 1 and 6, the example ACM 12 is part of an ECS 10 utilized on an aircraft. During scheduled inspection and maintenance, the air bearing shaft is examined along with the other parts of the ACM 12. The air bearing shaft interfaces with bearings 22A, 22B and 24. These parts can encounter wear that could require periodic replacement. The process for replacing an air bearing shaft as schematically indicated is schematically shown in FIG. 6. The process includes an initial step of disassembling one of the housing sections 44, 46, and 48 indicated at 96. Removal of one of the housing sections 44, 46, 48 may require preparation by removing surrounding aircraft components and panels to gain access to the ACM 12. Further, the conduits directing air into the ACM 12 may need to be removed.

Only one of the housing sections 44, 46, 48 may require disassembly to allow removal of the shaft. In any instance, the housing sections 44, 46, and 48 are secured by fasteners 50 that are removed to facilitate the required level of disassembly of the ACM 12 to allow removal of the shaft 14. The turbines 16, 18 and compressor 20 are all secured to the shaft 14 and may optionally be removed from the ACM 12 with the shaft 14 or remain within the ACM 12. In the example process, the turbines 16, 18 and compressor 20 are removed with the shaft 14. Accordingly, the method proceeds by removing the shaft 14 from the ACM 12 including the turbines 16, 18 and 20 as is indicated at 98. The turbines 16, 18 and 20 are then removed from the shaft 14 as indicated at 100. The turbines 16, 18 and 20 can then be inspected and treated independently of the shaft 14.

A new shaft 14 according to the disclosures in this application is then obtained and the turbines 16, 18 and 20 mounted to it as is indicated at 102. As appreciated, an existing ACM may include shafts that do not include the features of this disclosure. The example method includes the process of removing an old shaft and replacing it with an air bearing shaft including the features disclosed in this application. The configuration of the old shaft could include the features disclosed in this application, or may not.

The turbines 16, 18 and 20 may also remain within the ACM if they were not removed with the old shaft. The turbines 16, 18 and 20 could be replacement parts or could also be the old parts. In any instance, the turbines 16, 18 and 20 that are installed to the shaft 14 for reinstallation into the ACM meet any applicable requirements.

The shaft 14 is then installed into at least one of the housing sections 44, 46, 48. If not already completed, the turbines 16, 18 and the compressor 20 are fixed to the shaft 14. Once the shaft 14 is mounted in place, and any alignment or adjustment is performed, the housing sections 44, 46 and 48 are all reassembled as indicated at 106. The example housings are secured to each other by reinstalling the fasteners 50. The replacement process provides for the installation of the shaft 14 that includes the relationship between components such as the end caps 54, 56 and the center section 52 described within this application.

The disclosed and described ACM 12 includes the shaft 14 the center section 52 that includes a first diameter that interfaces with air bearings of the ACM 12 and a second diameter 62 that forms a part of the interface 88 with the corresponding one of the end sections 54, 56. The second diameter 62 is less than the first diameter 64 and extends an axial distance 84 from the end of the center section 52 such that interference with the welding beam 90 is substantially eliminated. Moreover, the configuration of the second diameter 62 relative to the first diameter 60 and the diameter 64 of the end section 54 provides for the weld beam 90 to be directed normal to the interface 88 such that weld quality and manufacturing efficiencies are improved.

Although an example embodiment has been disclosed, a worker of ordinary skill in this art would recognize that certain modifications would come within the scope of this disclosed example. Accordingly, the following claims should be studied to determine the scope and content of this invention.

What is claimed is:

1. An air bearing shaft comprising:
a center shaft section including an axially facing surface; and
an end cap including an axially facing end abutted against and welded to the axially facing surface of the center shaft section, wherein the end cap includes an outer diameter and the center shaft section including a first diameter and a second diameter substantially the same as the outer diameter, the second diameter is disposed at an interface between the axially facing surface of the center shaft section and the axially facing end of the end cap and the first diameter is greater than the second diameter and is spaced axially apart from the second diameter.

2. The air bearing shaft as recited in claim 1, including a transition region between the first diameter and the second diameter.

3. The air bearing shaft as recited in claim 2, wherein the transition region comprises a radius beginning at a point axially spaced away from the interface.

4. The air bearing shaft as recited in claim 1, wherein the end cap comprises first and second end caps attached to opposing ends of the center shaft.

5. The air bearing shaft as recited in claim 1, including a thrust flange attached to an intermediate point between ends of the center shaft section.

6. The air bearing shaft as recited in claim 1, wherein welding of the end cap and the center shaft comprises an electron beam weld.

7. An air cycle machine (ACM) comprising:
a shaft formed from a center shaft section and first and second end cap sections attached to each end of the center shaft section, an interface between the center shaft section and each of the first and second end cap sections includes a second diameter at an interface between axially facing surface and the axially facing end and a first diameter greater than the second diameter that is spaced axially apart from the second diameter;
a first turbine mounted on said shaft;
a second turbine mounted on said shaft; and
a compressor mounted on said shaft between said first turbine and said second turbine.

8. The ACM as recited in claim 7, wherein said center shaft section is electron-beam welded to each of the first and second end cap sections.

9. The ACM as recited in claim 7, wherein the center shaft includes a hollow internal cavity.

10. The ACM as recited in claim 9, wherein each of said first and second end cap sections include journal bearing surfaces that support radial loads on said shaft.

11. The ACM as recited in claim 10, wherein said shaft includes a radially thrust flange between the first and second end caps that supports axial loads on said shaft.

12. A method of manufacturing an air bearing shaft for an air cycle machine, the method comprising the steps of:
forming a center shaft section including a first outer diameter and a second outer diameter at each end, wherein the second outer diameter is smaller than the first outer diameter;
holding an axial surface of a first end cap against a first axial surface at an end of the center shaft section;
holding an axial surface of a second end cap against a second axial surface an another end of the center shaft section, wherein each of the first and second end caps include an outer diameter that is substantially the same as the second outer diameter of the center shaft;
forming a weld between abutted axial surfaces of the first end cap and the center shaft section;
forming a weld between abutted axial surfaces of the second end cap and the center shaft section; and
removing the shaft from a fixture after completion of welding operations on the first end cap and the second end cap.

13. The method as recited in claim 12, including the step of welding a thrust flange to the first outer diameter of the center shaft section.

14. The method as recited in claim 12, including the step of forming the center shaft section to include an inner cavity.

15. The method as recited in claim 12, wherein the second outer diameter on each end of the center shaft section begins at the corresponding axial surface and extends axially a distance away from the center shaft section end.

16. The method as recited in claim 12, including forming a transition surface between the first diameter and the second diameter, wherein the transition surface comprises a radius.

17. The method as recited in claim 12, wherein an electron beam is utilized to form the weld on between the first and second end caps and the center shaft section.

18. A method of installing an air bearing shaft into an air cycle machine (ACM), the method comprising the steps of:
removing at least a portion of a housing of the ACM such that a first air bearing shaft is removable from the ACM;
removing the first air bearing shaft from the ACM;
installing a second air bearing shaft into the space of the ACM in which the first air bearing shaft was removed, the second air bearing shaft including end caps attached to a center section where the center section includes a first diameter that is larger than a second diameter, with the second diameter disposed at ends of the center section to which the end caps are attached; and
reinstalling that portion of the housing of the ACM removed to provide for removal of the first air bearing shaft.

19. The method as recited in claim 18, including the step of aligning the end caps to the center section such that an outer diameter of each end cap is aligned with the second diameter of the center section.

20. The method as recited in claim 19, including the step of welding the end caps to the ends of the center section with a weld beam directed at angle substantially normal to an axis of rotation of the shaft.

21. The method as recited in claim 19, wherein the second diameter and the outer diameter of a corresponding one of the end caps comprise diameters that are different by no more than +/−0.010" of an inch.

22. The method as recited in claim 18, where the second diameter of the center shaft extends an axial length from an end of the center shaft to the first diameter.

\* \* \* \* \*